US010602491B2

(12) United States Patent
Zhang

(10) Patent No.: US 10,602,491 B2
(45) Date of Patent: Mar. 24, 2020

(54) COMMUNICATION METHOD AND DEVICE ON UNLICENSED FREQUENCY BAND IN UE AND BASE STATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 714 days.

(21) Appl. No.: 15/308,026

(22) PCT Filed: Apr. 28, 2015

(86) PCT No.: PCT/CN2015/077738
§ 371 (c)(1),
(2) Date: Oct. 31, 2016

(87) PCT Pub. No.: WO2015/165391
PCT Pub. Date: Nov. 5, 2015

(65) Prior Publication Data
US 2017/0086174 A1    Mar. 23, 2017

(30) Foreign Application Priority Data

May 1, 2014    (CN) .......................... 2014 1 0183097

(51) Int. Cl.
*H04W 72/04*    (2009.01)
*H04W 16/14*    (2009.01)

(52) U.S. Cl.
CPC ......... *H04W 72/042* (2013.01); *H04W 16/14* (2013.01); *H04W 72/04* (2013.01); *H04W 72/0446* (2013.01)

(58) Field of Classification Search
CPC ..................................................... H04W 72/04
See application file for complete search history.

(56) References Cited

U.S. PATENT DOCUMENTS

2019/0173620 A1*    6/2019 Oh ....................... H04L 1/1861

FOREIGN PATENT DOCUMENTS

| CN | 102843696 A | 12/2012 |
| CN | 103517456 A | 1/2014 |
| EP | 2713643 A1 | 4/2014 |

OTHER PUBLICATIONS

Men,Le; International Search Report and Written Opinion; International Application No. PCT/CN2015/077738; dated Jul. 28, 2015; State Intellectual Property Office of the P.R. China; Beijing, China.

* cited by examiner

*Primary Examiner* — Sulaiman Nooristany
(74) *Attorney, Agent, or Firm* — Maschoff Brennan

(57) ABSTRACT

The present invention provides a communication method and device on an unlicensed frequency band in a UE and a base station. To solve a scheduling problem caused by adoption of more flexible uplink and downlink sub frame configuration in an unlicensed spectrum, a UE receives high layer signaling sent by a base station. The high layer signaling indicates that a first carrier can be scheduled by control signaling transmitted in a second serving cell. The high layer signaling indicates that the first carrier can be scheduled by control signaling transmitted on the first carrier, or the first carrier can be scheduled by control signaling transmitted on the first carrier by default. The first carrier is deployed in an unlicensed spectrum, and the second serving cell is deployed in a licensed spectrum. The present invention supports adoption of more flexible uplink and downlink sub frame configuration in an unlicensed spectrum without introducing a new HARQ time sequence, and therefore, the (Continued)

spectrum efficiency is effectively improved. The present invention reuses the scheme in an existing cellular system as much as possible and thus has good compatibility.

6 Claims, 3 Drawing Sheets

COMMUNICATION METHOD AND DEVICE ON UNLICENSED FREQUENCY BAND IN UE AND BASE STATION

BACKGROUND

Technical Field

The present invention is related to a communication scheme adopting an unlicensed spectrum in a wireless communication system, and more particular to a communication method and device for an unlicensed spectrum based on Long Term Evolution (LTE).

Related Art

3rd Generation Partner Project (3GPP) defines a time division duplex (TDD) frame structure in a LTE system, as shown in Table 1, wherein D indicates a downlink sub frame, U indicates an uplink sub frame, and S is a particular sub frame.

TABLE 1

TDD LTE frame structure.

| TDD frame structure | Downlink-uplink switching point period | Sub frame index number | | | | | | | | | |
|---|---|---|---|---|---|---|---|---|---|---|---|
| | | 0 | 1 | 2 | 3 | 4 | 5 | 6 | 7 | 8 | 9 |
| #0 | 5 ms | D | S | U | U | U | D | S | U | U | U |
| #1 | 5 ms | D | S | U | U | D | D | S | U | U | D |
| #2 | 5 ms | D | S | U | D | D | D | S | U | D | D |
| #3 | 10 ms | D | S | U | U | U | D | D | D | D | D |
| #4 | 10 ms | D | S | U | U | D | D | D | D | D | D |
| #5 | 10 ms | D | S | U | D | D | D | D | D | D | D |
| #6 | 5 ms | D | S | U | U | U | D | S | U | U | D |

A R (Release) 12 of 3GPP introduces an enhanced interference management traffic adaptation (eIMTA) technique, i.e. for the TDD frame structure, it is capable of adjusting the TDD frame structure through a dynamic signaling. The possible TDD frame structure includes seven TDD frame structures #0-#6 defined by the LTE.

In a traditional 3GPP LTE system, data transmission may only occur on a licensed spectrum. However, with the sharp increase on the communication amount, especially in some urban areas, it may be difficult for the licensed spectrum to meet the requirement of the communication amount. 3GPP RAN1 (Radio Access Network Working Group 1) #62 meeting discussed a new research topic, i.e. a research of the unlicensed spectrum (RP-132085). The main purpose is to research the use of a non-standalone deployment of LTE on the licensed spectrum. The so-called non-standalone means that the communication on the unlicensed spectrum is associated with a serving cell on the licensed spectrum. An intuitive method is to reuse a concept of a carrier aggregation (CA) in the existing system as much as possible, i.e. a serving cell deployed on the licensed spectrum serves as Pcell (primary cell), a serving cell deployed on the unlicensed spectrum serves as Scell (secondary cell). The CA includes traditional TDD CA, FDD (frequency division duplex) and FDD-TDD CA introduced by 3GPP R12.

The carrier deployed on the unlicensed spectrum may be used to transmit the uplink and downlink data. In order to more flexibly accommodate a up and down asymmetric data burst, a more flexible (new) uplink and downlink sub frame configuration may be adopted on the unlicensed spectrum. How to schedule the unlicensed spectrum is a problem to be solved.

For the above problem, the present invention provides a communication method and device on an unlicensed frequency band in a UE and a base station.

SUMMARY

The present invention discloses a communication method on an unlicensed frequency band in a user equipment (UE), which includes the following steps:

Step A: receiving a high layer signaling; wherein the high layer signaling indicates that a first carrier is scheduled by a control signaling transmitted on a second serving cell; the high layer signaling indicates that the first carrier is scheduled by a control signaling transmitted on the first carrier or a first carrier is scheduled by a control signaling transmitted on the first carrier by default;

wherein the first carrier is deployed on an unlicensed spectrum, and the second serving cell is deployed on a licensed spectrum.

The essence of the above aspect is that for the UE, the unlicensed spectrum simultaneously supports a self-scheduling and a cross carrier scheduling. In one embodiment, the high layer signaling is a radio resource control (RRC) layer signaling. In one embodiment, the serving cell includes one carrier deployed on TDD licensed spectrum. In one embodiment, the serving cell includes one downlink carrier deployed on FDD licensed spectrum and one uplink deployed on FDD licensed spectrum. In one embodiment, the high layer signaling explicitly indicates that the control signaling for scheduling the first carrier is capable of transmitting on the first carrier and the second serving cell. In one embodiment, the high layer signaling explicitly indicates that a scheduling serving cell of the first carrier includes the second serving cell, and the first carrier is scheduled by the control signaling transmitted on the first carrier by default.

Specifically, according to one aspect of the present invention, the communication method further includes the following steps:

Step B: receiving a first control signaling on a first sub frame of the first carrier; receiving a first physical layer data on the first carrier according a schedule of the first control signal and transmitting a first ACK/NACK or transmitting a first physical layer data and receiving a first ACK (acknowledge)/NACK (non-acknowledge);

Step C: receiving a second control signaling on a second sub frame of the second serving cell; receiving a second physical layer data on the first carrier according to a schedule of the second control signaling and transmitting a second ACK/NACK or transmitting a second physical layer data and receiving a second ACK/NACK;

wherein the first sub frame and the second sub frame are two different sub frames in a time domain, the first ACK/NACK indicates that whether the first physical layer data is accurately received, and the second ACK/NACK indicates that whether the second physical layer data is accurately received.

In one embodiment, the control signaling is downlink schedule downlink control information (DCI), and a schedule information carried by the downlink schedule DCI is one of the schedule information of the DCI formats {1, 1A, 1B, 1C, 1D, 2, 2A, 2B, 2C, 2D}. In one embodiment, the control signaling is an uplink schedule DCI, and a schedule information carried by the uplink schedule DCI is one of the schedule information of the DCI formats {0, 4}.

Specifically, according to the above aspect of the present invention, the Step B further includes the following step:

Step B0: detecting a control signaling for scheduling the first carrier in a first sub frame set on the first carrier;

the Step C further includes the following step:

Step C0: detecting a control signaling for scheduling the first carrier in a second sub frame set on the second serving cell;

wherein the first sub frame set and the second sub frame set are orthogonal in a time domain, the first sub frame belongs to the first sub frame set, and the second sub frame belongs to the second sub frame set.

The first sub frame set and the second sub frame set are orthogonal in a time domain, i.e. there is no common sub frame in the first sub frame set and the second sub frame set. The UE only detects the downlink control signaling on one carrier in any one sub frame, so as to avoid increasing a maximum number of a blind detection.

In one embodiment, the first sub frame set is a null set. In another embodiment, the second sub frame is a null set.

Specifically, according to the above aspect of the present invention, the first sub frame set includes all sub frame wherein the first carrier is configured as a downlink sub frame, a particular sub frame, or a flexible sub frame, and the second control signaling is an uplink schedule signaling.

The essence of the above aspect is that the control signaling for scheduling the first carrier is preferentially transmitted on the first carrier. Only when the control signal for scheduling the first carrier corresponds to an uplink sub frame of the first carrier, the control signal is transmitted on the second serving cell.

In one embodiment, a second sub frame of the first carrier is scheduled by the uplink schedule DCI of the second serving cell. In another embodiment, the second subframe of the first carrier corresponds to the uplink sub frame of a current frame structure of the first carrier, and the frame structure is one of TDD UL/DL frame structures #0-#6. In one embodiment, the control signaling is a dynamic signaling. In one embodiment, the flexible sub frame indicates that a sub frame may configured as downlink or uplink by the physical layer signaling in eIMTA scenario.

Specifically, according to the above aspect of the present invention, the first control signaling is an uplink schedule signaling, a transmitting sub frame of the first physical layer data is a fourth sub frame after the first sub frame, and a transmitting sub frame of the first ACK/NACK is a sixth sub frame after the transmitting sub frame of the first physical layer data.

The essence of the above aspect, a hybrid automatic repeat request (HARQ) time sequence on the unlicensed spectrum does not consider a compatibility problem with a traditional UE; therefore it may use a round trip time (RTT) with 10 ms.

Specifically, according to one aspect of the present invention, the second sub frame set includes all sub frames in the second serving cell which can be used to transmit the control signaling for scheduling the first carrier.

The essence of the above aspect, the control signaling for scheduling the first carrier is preferentially transmitted on the second serving cell. Only when the control signaling for scheduling the first carrier corresponds to an uplink sub frame of the second serving cell, the control signaling is transmitted on the first carrier.

In one embodiment, the second serving cell is a TDD cell, the first carrier is configured as a dynamic uplink and downlink frame structure (i.e. any one sub frame may be configured as uplink or downlink), and the second sub frame set includes all downlink sub frames of the second serving cell. In one embodiment, the second serving cell is a TDD cell, the first carrier is configured as an uplink carrier, and the second sub frame set includes the sub frame that can be used to transmit the uplink schedule signaling on the second serving cell.

Specifically, according to the above aspect of the present invention, the second control signaling is an uplink schedule signaling, a transmitting sub frame of the second physical layer data is a fourth sub frame after the second sub frame, and a transmitting sub frame of the second ACK/NACK is a sixth sub frame after the transmitting sub frame of the second physical layer data.

Specifically, according to one aspect of the present invention, the first sub frame set is indicated by the high layer signaling; or the second sub frame set is indicated by the high layer signaling; or both of the first frame set and the second frame set are indicated by the high layer signaling.

In one embodiment, the high layer signaling includes N1 bits, wherein each bit indicates whether one sub frame belongs to a first sub frame set, State I indicates that it belongs to the first sub frame set, and State II indicates that it does not belong to the first sub frame set. The second sub frame set includes all downlink sub frames of the second serving cell except the first sub frame set, and the N1 is a positive integer.

In one embodiment, the high layer signaling includes N2 bits, wherein each bit indicates whether one sub frame belongs to a second sub frame set, State I indicates that it belongs to the second sub frame set, and State H indicates that it does not belong to the second sub frame set. The first sub frame set includes all sub frames except the second sub frame set or the first sub frame set includes all downlink sub frame of the first carrier except the second sub frame set, and the N2 is a positive integer.

In one embodiment, the high layer signaling includes N3 bits, wherein each bit indicates that one sub frame belongs to which sub frame set, State I indicates that it belongs to the first sub frame set, and State II indicates that it belongs to the second sub frame set, and the N3 is a positive integer.

Specifically, according to one aspect of the present invention, the second serving cell is a TDD cell.

The present invention discloses a communication method on an unlicensed frequency band in a base station, which includes the following steps:

Step A: transmitting a high layer signaling; the high layer signaling indicates that a first carrier is scheduled by a control signaling transmitted on a second serving cell; the high layer signaling indicates that the first carrier is scheduled by a control signaling transmitted on the first carrier or a first carrier is scheduled by a control signaling transmitted on the first carrier by default;

wherein the first carrier is deployed on an unlicensed spectrum, and the second serving cell is deployed on a licensed spectrum.

Specifically, according to one aspect of the present invention, the communication method further includes the following steps:

Step B: transmitting a first control signaling on a first sub frame of the first carrier; transmitting a first physical layer data on the first carrier according a schedule of the first control signal and receiving a first ACK/NACK or receiving a first physical layer data and transmitting a first ACK/NACK;

Step C: transmitting a second control signaling on a second sub frame of the second serving cell; transmitting a second physical layer data on the first carrier according to a schedule of the second control signaling and receiving a second ACK/NACK or receiving a second physical layer data and transmitting a second ACK/NACK;

wherein the first sub frame and the second sub frame are two different sub frames in a time domain, the first ACK/NACK indicates that whether the first physical layer data is accurately received, and the second ACK/NACK indicates that whether the second physical layer data is accurately received.

Specifically, according to above aspect of the present invention, the first sub frame belongs to a first sub frame set, the second sub frame belongs to a second sub frame set, and the first sub frame set and the second sub frame are orthogonal in a time domain.

The first sub frame set and the second sub frame are orthogonal in a time domain, i.e. there is no common sub frame in the first sub frame set and the second sub frame set.

Specifically, according to above aspect of the present invention, the first sub frame set includes all sub frame wherein the first carrier is configured as a downlink sub frame, a particular sub frame, or a flexible sub frame, and the Second control signaling is an uplink schedule signaling.

In one embodiment, a second sub frame of the first carrier is scheduled by the uplink schedule DCI of the second serving cell. In another embodiment, the second serving cell of the first carrier corresponds to the UL sub frame of the first carrier in a current frame structure, and the frame structure is one of TDD UL/DL frame structures #0-#6. In one embodiment, the control signaling is a dynamic signaling. In one embodiment, the flexible sub frame indicates that a sub frame does not scheduled by the uplink schedule signaling.

Specifically, according to above aspect of the present invention, the first control signaling is an uplink schedule signaling, a transmitting sub frame of the first physical layer data is a fourth sub frame after the first sub frame, and a transmitting sub frame of the first ACK/NACK is a sixth sub frame after the transmitting sub frame of the first physical layer data.

Specifically, according to above aspect of the present invention, the second sub frame set includes all sub frames in the second serving cell which can be used to transmit the control signaling for scheduling the first carrier.

In one embodiment, the first carrier is configured as a given frame structure by the physical layer signaling, the given frame structure is any one of {TDD UL/DL frame structures #0-#6, uplink frame structure, FDD downlink frame structure}, and the frame included in the second sub frame set is a frame which may schedule a corresponding frame of the given frame structure in the second serving cell.

Specifically, according to above aspect of the present invention, the second control signaling is an uplink schedule signaling, a transmitting sub frame of the second physical layer data is a fourth sub frame after the second sub frame, and a transmitting sub frame of the second ACK/NACK is a sixth sub frame after the transmitting sub frame of the second physical layer data.

Specifically, according to above aspect of the present invention, the first sub frame set is indicated by the high layer signaling; or the second sub frame set is indicated by the high layer signaling; or both of the first frame set and the second frame set are indicated by the high layer signaling.

In one embodiment, the high layer signaling includes N1 bits, wherein each bit indicates whether one sub frame belongs to a first sub frame set, State I indicates that it belongs to the first sub frame set, and State II indicates that it does not belong to the first sub frame set. The second sub frame set includes all downlink sub frames of the second serving cell except the first sub frame set, and the N1 is a positive integer.

In one embodiment, the high layer signaling includes N2 bits, wherein each bit indicates whether one sub frame belongs to a second sub frame set, State I indicates that it belongs to the second sub frame set, and State II indicates that it does not belong to the second sub frame set. The first sub frame set includes all sub frames except the second sub frame set or the first sub frame set includes all downlink sub frame of the first carrier except the second sub frame set, and the N2 is a positive integer.

In one embodiment, the high layer signaling includes N3 bits, wherein each bit indicates that one sub frame belongs to which sub frame set, State I indicates that it belongs to the first sub frame set, and State II indicates that it belongs to the second sub frame set, and the N3 is a positive integer.

Specifically, according to one aspect of the present invention, the second serving cell is a TDD cell.

The present invention discloses an user equipment, which includes:

a first module, for receiving a high layer signaling; the high layer signaling indicates that a first carrier is scheduled by a control signaling transmitted on a second serving cell; the high layer signaling indicates that the first carrier is scheduled by a control signaling transmitted on the first carrier or a first carrier is scheduled by a control signaling transmitted on the first carrier by default;

a second module, for detecting a control signaling for scheduling the first carrier in a first sub frame set on the first carrier; receiving a first control signaling on a first sub frame of the first carrier; receiving a first physical layer data on the first carrier according a schedule of the first control signal and transmitting a first ACK/NACK or transmitting a first physical layer data and receiving a first ACK/NACK;

a third module, for detecting a control signaling for scheduling the first carrier in a second sub frame set on the second serving cell; receiving a second control signaling on a second sub frame of the second serving cell; receiving a second physical layer data on the first carrier according to a schedule of the second control signaling and transmitting a second ACK/NACK or transmitting a second physical layer data and receiving a second ACK/NACK;

wherein the first carrier is deployed on an unlicensed spectrum, the second serving cell is deployed on a licensed spectrum, the first sub frame set and the second sub frame set are orthogonal in a time domain, the first sub frame belongs to the first sub frame set, the second sub frame belongs to the second sub frame set, the first ACK/NACK indicates that whether the first physical layer data is accurately received, and the second ACK/NACK indicates that whether the second physical layer data is accurately received.

In one embodiment, in the above user equipment, the first sub frame set includes all sub frame wherein the first carrier is configured as a downlink sub frame, a particular sub frame, or a flexible sub frame, and the second control signaling is an uplink schedule signaling; or the second sub frame set includes all sub frames in the second serving cell which can be used to transmit the control signaling for scheduling the first carrier; or the first sub frame set is indicated by the high layer signaling; or the second sub frame set is indicated by the high layer signaling; or both of the first frame set and the second flame set are indicated by the high layer signaling.

The present invention discloses a base station equipment, which includes:

a first module, for transmitting a high layer signaling; the high layer signaling indicates that a first carrier is scheduled by a control signaling transmitted on a second serving cell; the high layer signaling indicates that the first carrier is scheduled by a control signaling transmitted on the first carrier or a first carrier is scheduled by a control signaling transmitted on the first carrier by default;

a second module, for transmitting a first control signaling on a first sub frame of the first carrier; transmitting a first physical layer data on the first carrier according a schedule of the first control signal and receiving a first ACK/NACK or receiving a first physical layer data and transmitting a first ACK/NACK;

a third module, for transmitting a second control signaling on a second sub frame of the second serving cell; transmitting a second physical layer data on the first carrier according to a schedule of the second control signaling and receiving a second ACK/NACK or receiving a second physical layer data and receiving a second ACK/NACK;

wherein the first carrier is deployed on an unlicensed spectrum, the second serving cell is deployed on a licensed spectrum, the first sub frame belongs to a first sub frame set, the second sub frame belongs to a second sub frame set, the first sub frame set and the second sub frame are orthogonal in a time domain, the first ACK/NACK indicates that whether the first physical layer data is accurately received, and the second ACK/NACK indicates that whether the second physical layer data is accurately received.

In one embodiment, in the above base station, the first sub frame set includes all sub frame wherein the first carrier is configured as a downlink sub frame, a particular sub frame, or a flexible sub frame, and the second control signaling is an uplink schedule signaling; or the second sub frame set includes all sub frames in the second serving cell which can be used to transmit the control signaling for scheduling the first carrier; or the first sub frame set is indicated by the high layer signaling; or the second sub frame set is indicated by the high layer signaling; or both of the first frame set and the second frame set are indicated by the high layer signaling.

For a scheduling problem caused by adopting more flexible uplink and downlink sub frame configuration in an unlicensed spectrum, the present invention discloses a communication method and device on an unlicensed frequency band. A UE receives a high layer signaling transmitted by a base station to determine that a first carrier is scheduled by the first carrier and a second serving cell, wherein the first carrier is deployed on the unlicensed spectrum, and the second serving cell is deployed on a licensed spectrum. The present invention supports an adoption of more flexible uplink and downlink sub frame configuration in an unlicensed spectrum without introducing a new HARQ time sequence, thereby effectively increasing a spectrum efficiency. The present invention reuses a CA scheme in an existing LTE as much as possible and thus has good compatibility.

BRIEF DESCRIPTION OF THE DRAWINGS

The above and other exemplary aspects, features and advantages of certain exemplary embodiments of the present invention will be more apparent from the following description taken in conjunction with the accompanying drawings, in which.

DETAILED DESCRIPTION

The following description with reference to the accompanying drawings is provided to explain the exemplary embodiments of the invention. Note that in the case of no conflict, the embodiments of the present invention and the features of the embodiments may be arbitrarily combined with each other.

Embodiment I

Figure 1:
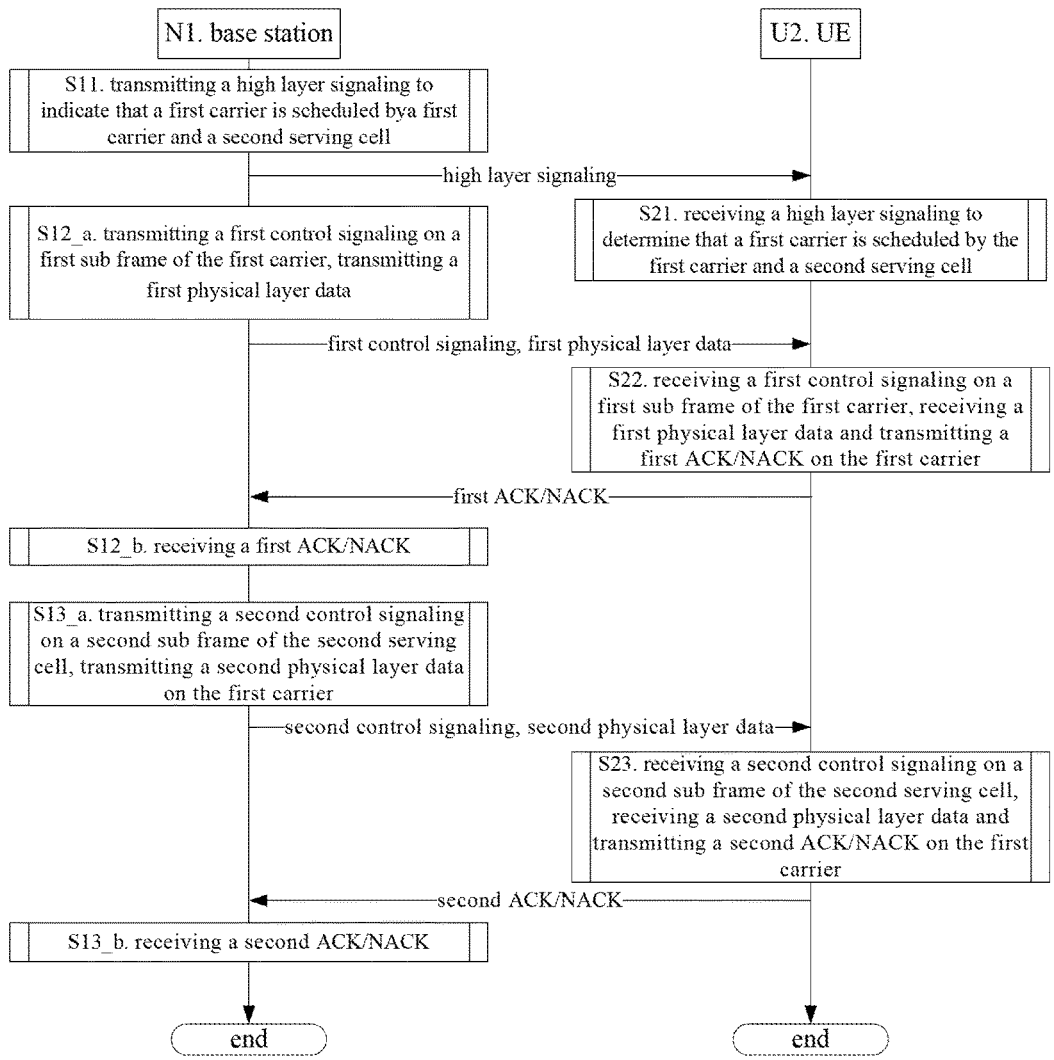
FIG. 1 is a flowchart of scheduling an unlicensed spectrum according to one embodiment of the present invention.

Embodiment I illustrates a flowchart of scheduling an unlicensed spectrum, as shown in FIG. 1. In FIG. 1, the base station N1 is a serving base station of UE U2.

For the base station N1, in step S11, the method involves transmitting a high layer signaling to indicate that a first carrier is scheduled by a control signaling transmitted on a first carrier and a second serving cell. In step S12_a, the method involves transmitting a first control signaling on a first sub frame of the first carrier; transmitting a first physical layer data on the first carrier according to a schedule of the first control signaling; in step S12_b, the method involves receiving a first ACK/NACK, and the step S12_a and the step S12_b are collectively referred as step S12. In step S_a, the method involves transmitting a second control signaling on a second sub frame of the second serving cell; transmitting a second physical layer data on the first carrier according to a schedule of the second control signaling; in step S13_b, the method involves receiving a second ACK/NACK, and the step S13_a and the step S13_b are collectively referred as step S13.

For the UE U2, in step S21, the method involves receiving a high layer signaling to determine that a first carrier is scheduled by a control signaling transmitted on the first carrier and a second serving cell. In step S22, the method involves receiving a first control signaling on a first sub frame of the first carrier; receiving a first physical layer data on the first carrier according a schedule of the first control signal and transmitting a first ACK/NACK. In step S23, the method involves receiving a second control signaling on a second sub frame of the second serving cell; receiving a second physical layer data on the first carrier according to a schedule of the second control signaling and transmitting a second ACK/NACK.

In Embodiment I, the first carrier is deployed on an unlicensed spectrum, the second serving cell is deployed on a licensed spectrum, the first sub frame and the second sub frame are two different sub frames in a time domain, the first ACK/NACK indicates that whether the first physical layer data is accurately received, and the second ACK/NACK indicates that whether the second physical layer data is accurately received.

In a first exemplary embodiment of Embodiment I, the step S22 further includes: the method involves detecting a control signaling for scheduling the first carrier in a first sub frame set on the first carrier; the step S23 further includes: the method involves detecting a control signaling for scheduling the first carrier in a second sub frame set on the second serving cell.

In a first exemplary embodiment of Embodiment I, the first sub frame set and the second sub frame set are orthogonal in a time domain, the first sub frame belongs to the first sub frame set, and the second sub frame belongs to the second sub frame set. The first sub frame set includes all sub frame wherein the first carrier is configured as a downlink sub frame, a particular sub frame, or a flexible sub frame, and the second control signaling is an uplink schedule signaling; the second sub frame set includes all sub frames in the second serving cell which can be used to transmit the control signaling for scheduling the first carrier; the first sub frame set is indicated by the high layer signaling; or the second sub frame set is indicated by the high layer signaling; or both of the first frame set and the second frame set are indicated by the high layer signaling.

In a second exemplary embodiment of Embodiment I, the second serving cell is a TDD cell.

Embodiment II

Figure 2:
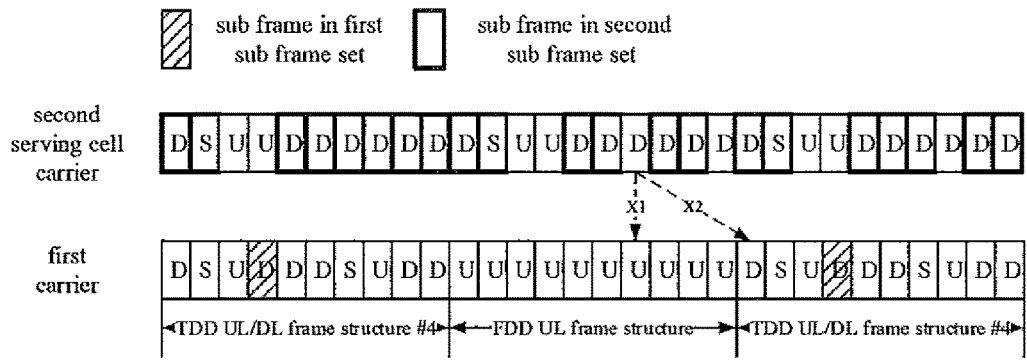
FIG. 2 is schematic vies of preferentially scheduling a second serving cell according to one embodiment of the present invention.

Embodiment II is a schematic view of preferentially scheduling a second serving cell, as shown in FIG. 2. In FIG. 2, a small square identified by a slash is a sub frame in a first sub frame set, and a small square identified by a thick line is a sub frame in a second sub frame set.

For the base station, firstly, a high layer signaling is transmitted to indicate that a first carrier is scheduled by a control signaling transmitted on a first cell and a second serving cell. Then, a first control signaling is transmitted on a first sub frame of the first carrier; a first physical layer data is transmitted on the first carrier according a schedule of the first control signal and a first ACK/NACK is received or a first physical layer data is received and a first ACK/NACK is transmitted. Then, a second control signaling is transmitted on a second sub frame of the second serving cell; a second physical layer data is transmitted on the first carrier according to a schedule of the second control signaling and a second ACK/NACK is received or a second physical layer data is received and a second ACK/NACK is transmitted.

For the UE, firstly, a high layer signaling is received to determine that a first carrier is scheduled by a control signaling transmitted on the first carrier and a second serving cell. Then, a control signaling for scheduling the first carrier is detected in a first sub frame set on the first carrier; a first control signaling is received on a first sub frame of the first carrier; a first physical layer data is received on the first carrier according a schedule of the first control signal and a first ACK/NACK is transmitted or a first physical layer data is transmitted and a first ACK/NACK is received. Then, a control signaling for scheduling the first carrier is detected in a second sub frame set on the second serving cell; a second control signaling is received on a second sub frame of the second serving cell; a second physical layer data is received on the first carrier according to a schedule of the second control signaling and a second ACK/NACK is transmitted or a second physical layer data is transmitted and a second ACK/NACK is received.

In Embodiment II, the first carrier is deployed on an unlicensed spectrum, the second serving cell is deployed on a TDD cell of a licensed spectrum, the first sub frame set and the second sub frame set are orthogonal in a time domain, the first sub frame belongs to the first sub frame set, and the second sub frame belongs to the second sub frame set, the first carrier is configured as TDD UL/DL frame structure #4 in a first frame and a third frame, and the first carrier is configured as full uplink frame structure in a second frame. The second sub frame set includes all sub frames in the second serving cell which can be used to transmit the control signaling for scheduling the first carrier, the first sub frame set includes a downlink sub frame corresponding to the second serving cell uplink in the first carrier. The first ACK/NACK indicates that whether the first physical layer data is accurately received, and the second ACK/NACK indicates that whether the second physical layer data is accurately received.

For a given downlink frame of the second serving cell, if it corresponds to an uplink sub frame of the first carrier (as shown by an arrow X1) and it corresponds to a downlink sub frame of the first carrier (as shown by an arrow X2) after k-th sub frame, the given sub frame is a sub frame which may not transmit the control signaling for scheduling the first carrier, i.e. it does not belong to the second sub frame set, and the k is an uplink schedule time delay for scheduling the first carrier by the second serving cell.

Embodiment III

Figure 3:
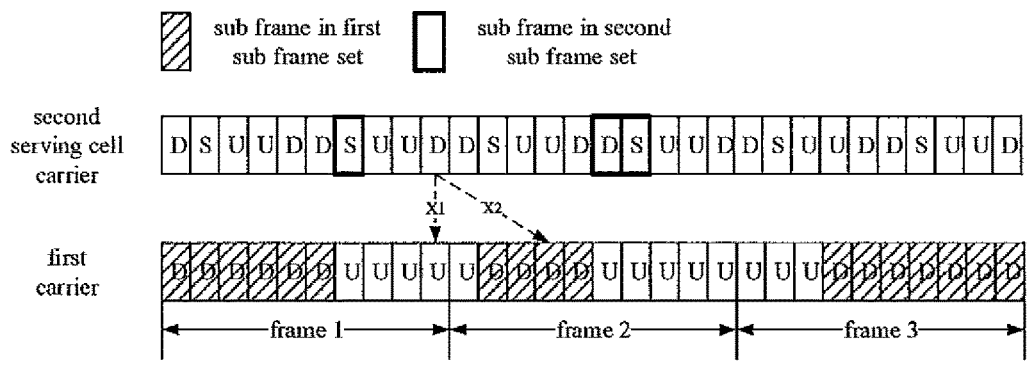
FIG. 3 is a schematic vies of preferentially scheduling a first carrier according to one embodiment of the present invention.

Embodiment III is a schematic view of preferentially scheduling a first carrier, as shown in FIG. 3. In FIG. 3, a small square identified by a slash is a sub frame in a first sub frame set, and a small square identified by a thick line is a sub frame in a second sub frame set.

For the base station, firstly, a high layer signaling is transmitted to indicate that a first carrier is scheduled by a control signaling transmitted on a first cell and a second serving cell. Then, a first control signaling is transmitted on a first sub frame of the first carrier; a first physical layer data is transmitted on the first carrier according a schedule of the first control signal and a first ACK/NACK is received or a first physical layer data is received and a first ACK/NACK is transmitted. Then, a second control signaling is transmitted on a second sub frame of the second serving cell; a second physical layer data is transmitted on the first carrier according to a schedule of the second control signaling and a second ACK/NACK is received or a second physical layer data is received and a second ACK/NACK is transmitted.

For the UE, firstly, a high layer signaling is received to determine that a first carrier is scheduled by a control signaling transmitted on the first carrier and a second serving cell. Then, a control signaling for scheduling the first carrier is detected in a first sub frame set on the first carrier; a first control signaling is received on a first sub frame of the first carrier; a first physical layer data is received on the first carrier according a schedule of the first control signal and a first ACK/NACK is transmitted or a first physical layer data is transmitted and a first ACK/NACK is received. Then, a control signaling for scheduling the first carrier is detected in a second sub frame set on the second serving cell; a second control signaling is received on a second sub frame of the second serving cell; a second physical layer data is received on the first carrier according to a schedule of the second control signaling and a second ACK/NACK is transmitted or a second physical layer data is transmitted and a second ACK/NACK is received.

In Embodiment III, the first carrier is deployed on an unlicensed spectrum, the second serving cell is deployed on a TDD cell of a licensed spectrum, the first sub frame set and the second sub frame are orthogonal in a time domain, the first sub frame belongs to a first sub frame set, the second sub frame belongs to a second sub frame set, and the first carrier is configured as a dynamic duplex mode. The first sub frame set includes all downlink sub frames of the first carrier, and the second sub frame set includes all sub frames in the second serving cell which can be used to transmit the control signaling for scheduling the first carrier and correspond to the first carrier uplink. The first ACK/NACK indicates that whether the first physical layer data is accurately received, and the second ACK/NACK indicates that whether the second physical layer data is accurately received.

For a given downlink frame of the second serving cell, if it corresponds to an uplink sub frame of the first carrier (as shown by an arrow X1) and it corresponds to a downlink sub frame of the first carrier (as shown by an arrow X2) after k-th sub frame, the given sub frame is a sub frame which may not transmit the control signaling for scheduling the first carrier, i.e. it does not belong to the second sub frame set, and the k is an uplink schedule time delay for scheduling the first carrier by the second serving cell.

Embodiment IV

Figure 4:
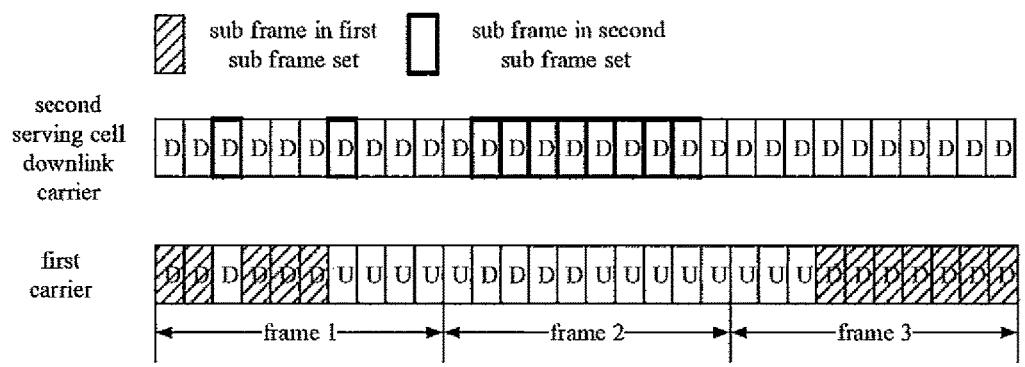
FIG. 4 is a schematic vies of configuring a schedule sub frame by a high layer signaling according to another embodiment of the present invention.

Embodiment IV is a schematic view of configuring a schedule sub frame by a high layer signaling, as shown in FIG. 4. In FIG. 4, a small square identified by a slash is a sub frame in a first sub frame set, and a small square identified by a thick line is a sub frame in a second sub frame set.

For the base station, firstly, a high layer signaling is transmitted to indicate that a first carrier is scheduled by a control signaling transmitted on a first cell and a second serving cell. Then, a first control signaling is transmitted on a first sub frame of the first carrier; a first physical layer data is transmitted on the first carrier according a schedule of the first control signal and a first ACK/NACK is received or a first physical layer data is received and a first ACK/NACK is transmitted. Then, a second control signaling is transmitted on a second sub frame of the second serving cell; a second physical layer data is transmitted on the first carrier according to a schedule of the second control signaling and a second ACK/NACK is received or a second physical layer data is received and a second ACK/NACK is transmitted.

For the UE, firstly, a high layer signaling is received to determine that a first carrier is scheduled by a control signaling transmitted on the first carrier and a second serving cell. Then, a control signaling for scheduling the first carrier is detected in a first sub frame set on the first carrier; a first control signaling is received on a first sub frame of the first carrier; a first physical layer data is received on the first carrier according a schedule of the first control signal and a first ACK/NACK is transmitted or a first physical layer data is transmitted and a first ACK/NACK is received. Then, a control signaling for scheduling the first carrier is detected in a second sub frame set on the second serving cell; a second control signaling is received on a second sub frame of the second serving cell; a second physical layer data is received on the first carrier according to a schedule of the second control signaling and a second ACK/NACK is transmitted or a second physical layer data is transmitted and a second ACK/NACK is received.

In Embodiment IV, the first carrier is deployed on an unlicensed spectrum, the second serving cell is deployed on a FDD cell a licensed spectrum, the first sub frame set and the second sub frame are orthogonal in a time domain, the first sub frame belongs to a first sub frame set, the second sub frame belongs to a second sub frame set, and the first carrier is configured as a dynamic duplex mode. The first ACK/NACK indicates that whether the first physical layer data is accurately received, and the second ACK/NACK indicates that whether the second physical layer data is accurately received.

In a first exemplary embodiment of Embodiment IV, the high layer signaling includes N1 bits, wherein each bit indicates whether one sub frame belongs to a first sub frame set, State I indicates that it belongs to the first sub frame set, and State II indicates that it does not belong to the first sub frame set. The second sub frame set includes all downlink sub frames of the second serving cell except the first sub frame set, and the N1 is a positive integer multiple of 10. If the sub frame corresponding to the given bit is configured as an uplink sub frame on the first carrier, the UE omits a configuration of the given bit.

Embodiment V

Figure 5:
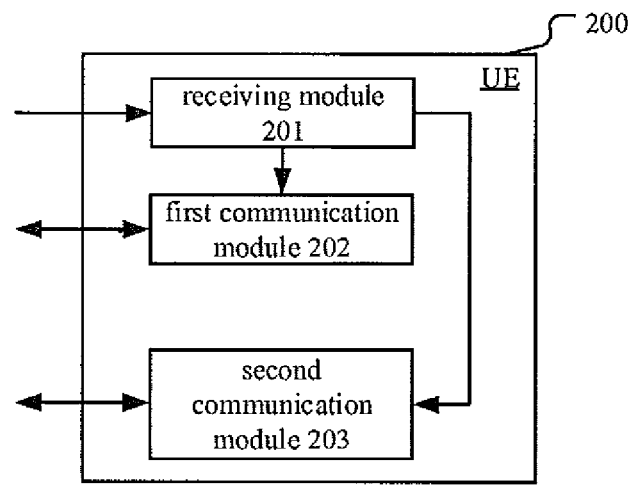
FIG. 5 is a structure diagram illustrating a processing device in an user equipment according to one embodiment of the present invention.

Embodiment V is a structure diagram illustrating a processing device in an user equipment, as shown in FIG. 5. In FIG. 5, the processing device 200 in the UE mainly includes a receiving module 201, a first communication module 202, and a second communication module 203.

The receiving module 201 is used for receiving a high layer signaling to determine that a first carrier is scheduled by a control signaling transmitted on the first carrier and a second serving cell; the first communication module 202 is used for detecting a control signaling for scheduling the first carrier in a first sub frame set on the first carrier; receiving a first control signaling on a first sub frame of the first carrier; receiving a first physical layer data on the first carrier according a schedule of the first control signal and transmitting a first ACK/NACK or transmitting a first physical layer data and receiving a first ACK/NACK; the second communication module 203 is used for detecting a control signaling for scheduling the first carrier in a second sub frame set on the second serving cell; receiving a second control signaling on a second sub frame of the second serving cell; receiving a second physical layer data on the first carrier according to a schedule of the second control signaling and transmitting a second ACK/NACK or transmitting a second physical layer data and receiving a second ACK/NACK.

In Embodiment V, the first carrier is deployed on an unlicensed spectrum, the second serving cell is deployed on a licensed spectrum, the first sub frame set and the second sub frame set are orthogonal in a time domain, the first sub frame belongs to the first sub frame set, the second sub frame belongs to the second sub frame set. The first ACK/NACK indicates that whether the first physical layer data is accurately received, and the second ACK/NACK indicates that whether the second physical layer data is accurately received.

In a first exemplary embodiment of Embodiment V, the second sub frame set includes all sub frames in the second serving cell which can be used to transmit the control signaling for scheduling the first carrier and the first sub frame set includes a downlink sub frame corresponding to the second serving cell uplink in the first carrier.

In a second exemplary embodiment of Embodiment V, both of the first sub frame and the second sub frame are indicated by the high layer signaling.

In a third exemplary embodiment of Embodiment V, the first control signaling is an uplink schedule signaling, a transmitting sub frame of the first physical layer data is a fourth sub frame after the first sub frame, and a transmitting sub frame of the first ACK/NACK is a sixth sub frame after the transmitting sub frame of the first physical layer data.

Embodiment VI

Figure 6:
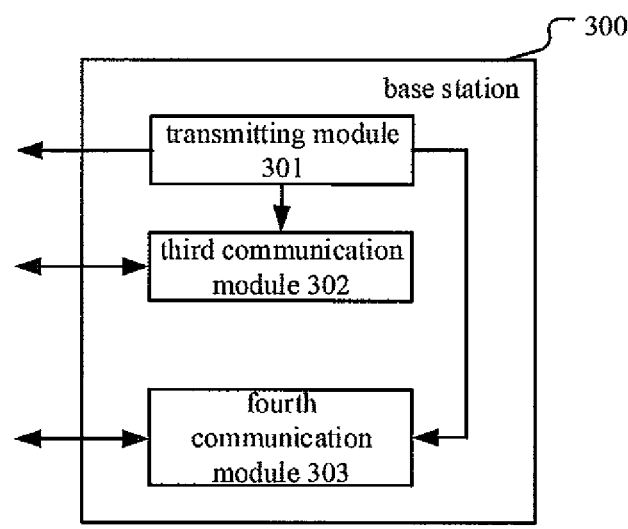
FIG. 6 is a structure diagram illustrating a processing device in a base station equipment according to one embodiment of the present invention.

Embodiment VI is a structure diagram illustrating a processing device in a base station equipment according to one embodiment of the present invention, as shown in FIG. 6. In FIG. 6, the processing device 300 mainly includes a transmitting module 301, a third communication module 302 and a fourth communication module 303.

The transmitting module 301 is used for transmitting a high layer signaling to indicate that a first carrier is scheduled by a control signaling transmitted on the first carrier and a second serving cell; the third communication module 302 is used for transmitting a first control signaling on a first sub frame of the first carrier; transmitting a first physical layer data on the first carrier according a schedule of the first control signal and receiving a first ACK/NACK or receiving a first physical layer data and transmitting a first ACK/NACK; the fourth communication module 303 is used for transmitting a second control signaling on a second sub frame of the second serving cell; transmitting a second physical layer on the first carrier according to a schedule of the second control signaling data and receiving a second ACK/NACK or receiving a second physical layer data and receiving a second ACK/NACK.

In Embodiment VI, the first carrier is deployed on an unlicensed spectrum, the second serving cell is deployed on a licensed spectrum, the first sub frame belongs to a first sub frame set, the second sub frame belongs to a second sub frame set, the first sub frame set and the second sub frame are orthogonal in a time domain, the first ACK/NACK indicates that whether the first physical layer data is accurately received, and the second ACK/NACK indicates that whether the second physical layer data is accurately received.

In a first exemplary embodiment of Embodiment VI, the first sub frame set includes all sub frame wherein the first carrier is configured as a downlink sub frame, a particular sub frame, or a flexible sub frame, the second control signaling is an uplink schedule signaling and the second sub frame set includes all sub frames in the second serving cell which can be used to transmit the control signaling for scheduling the first carrier and correspond to the first carrier uplink.

In a second exemplary embodiment of Embodiment VI, both of the first sub frame set and the second sub frame are indicated by the high layer signaling.

In a third exemplary embodiment of Embodiment VI, the second control signaling is an uplink schedule signaling, a transmitting sub frame of the second physical layer data is a fourth sub frame after the second sub frame, and a transmitting sub frame of the second ACK/NACK is a sixth sub frame after the transmitting sub frame of the second physical layer data.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present invention is not limited to any particular form of combination of software and hardware.

Although the present invention is illustrated and described with reference to specific embodiments, those skilled in the art will understand that many variations and modifications are readily attainable without departing from the spirit and scope thereof as defined by the appended claims and their legal equivalents.

What is claimed is:

1. A communication method on an unlicensed frequency band in a UE, the communication method comprising:
   Step A: receiving a high layer signaling; wherein the high layer signaling indicates that a first carrier is scheduled by a control signaling transmitted on a second serving cell; the high layer signaling indicates that the first carrier is scheduled by a control signaling transmitted on the first carrier or a first carrier is scheduled by a control signaling transmitted on the first carrier by default;
   Step B: receiving a first control signaling on a first sub frame of the first carrier; receiving a first physical layer data on the first carrier according a schedule of the first control signal and transmitting a first ACK/NACK or transmitting a first physical layer data and receiving a first ACK/NACK; and
   Step C: receiving a second control signaling on a second sub frame of the second serving cell; receiving a second physical layer data on the first carrier according to a schedule of the second control signaling and transmitting a second ACK/NACK or transmitting a second physical layer data and receiving a second ACK/NACK;
   wherein the first carrier is deployed on an unlicensed spectrum, the second serving cell is deployed on a licensed spectrum, the first sub frame and the second sub frame are two different sub frames in a time domain, the first ACK/NACK indicates whether the first physical layer data is accurately received, and the second ACK/NACK indicates whether the second physical layer data is accurately received.

2. The communication method on the unlicensed frequency band in the UE according to claim 1, wherein Step B further comprises:
   Step B0: detecting a control signaling for scheduling the first carrier in a first sub frame set on the first carrier; and
   Step C0: detecting a control signaling for scheduling the first carrier in a second sub frame set on the second serving cell;
   wherein the first sub frame set and the second sub frame set are orthogonal in the time domain, the first sub frame belongs to the first sub frame set, and the second sub frame belongs to the second sub frame set.

3. The communication method on the unlicensed frequency band in the UE according to claim 2, wherein:
   the first sub frame set comprises all sub frame wherein the first carrier is configured as a downlink sub frame, a particular sub frame, or a flexible sub frame, and the second control signaling is an uplink schedule signaling; or the second sub frame set comprises all sub frames in the second serving cell which transmit the control signaling for scheduling the first carrier, or the first sub frame set is indicated by the high layer signaling; or the second sub frame set is indicated by the high layer signaling; or both of the first frame set and the second frame set are indicated by the high layer signaling.

4. The communication method on the unlicensed frequency band in the UE according to claim 2, wherein the first control signaling is an uplink schedule signaling, a transmitting sub frame of the first physical layer data is a fourth sub frame after the first sub frame, and a transmitting sub frame of the first ACK/NACK is a sixth sub frame after the transmitting sub frame of the first physical layer data.

5. The communication method on the unlicensed frequency band in the UE according to claim 1, wherein the second serving cell is a TDD cell.

6. User equipment comprising:
hardware including a processing system and one or more antennas, the hardware being configured to perform operations comprising:
receiving a high layer signaling; wherein the high layer signaling indicates that a first carrier is scheduled by a control signaling transmitted on a second serving cell; the high layer signaling indicates that the first carrier is scheduled by a control signaling transmitted on the first carrier or a first carrier is scheduled by a control signaling transmitted on the first carrier by default;
detecting a control signaling for scheduling the first carrier in a first sub frame set on the first carrier; receiving a first control signaling on a first sub frame of the first carrier; receiving a first physical layer data on the first carrier according a schedule of the first control signal and transmitting a first ACK/NACK or transmitting a first physical layer data and receiving a first ACK/NACK; and
detecting a control signaling for scheduling the first carrier in a second sub frame set on the second serving cell; receiving a second control signaling on a second sub frame of the second serving cell; receiving a second physical layer data on the first carrier according to a schedule of the second control signaling and transmitting a second ACK/NACK or transmitting a second physical layer data and receiving a second ACK/NACK,
wherein the first carrier is deployed on an unlicensed spectrum, the second serving cell is deployed on a licensed spectrum, the first sub frame set and the second sub frame set are orthogonal in a time domain, the first sub frame belongs to the first sub frame set, the second sub frame belongs to the second sub frame set, the first ACK/NACK indicates whether the first physical layer data is accurately received, and the second ACK/NACK indicates whether the second physical layer data is accurately received.

* * * * *